United States Patent Office 2,804,384
Patented Aug. 27, 1957

2,804,384

METHOD FOR PRODUCING TITANIUM CONCENTRATES

David L. Armant, Metuchen, N. J., and Harold S. Sigurdson, Indianapolis, Ind., assignors to National Lead Company, New York, N. Y., a corporation of New Jersey No Drawing. Application March 10, 1955,
Serial No. 493,611

5 Claims. (Cl. 75—1)

This invention relates to titaniferous compositions of matter which react readily with strong mineral acids, particularly sulphuric acid, and to methods for preparing the same. This application is a continuation-in-part of our application Serial No. 257,978, filed November 23, 1951, now abandoned.

Industrial processes for the preparation of titanium dioxide pigments depend, in the first instance, upon a reaction between an iron-containing titaniferous material, ilmenite ore and strong sulphuric acid. By means of this reaction which, in the trade, is generally termed "digestion" or "attack," the titanium and iron values, among others are solubilized. The iron values play no important role in the process and are almost invariably removed after dissolution, as by crystallization. However, in the digestion reaction they consume valuable acid which adds to the cost of producing the finished product.

Consequently, interest has developed in titaniferous compositions such as slags which contain a higher proportion of titanium than is usually present in ilmenite and relatively lower proportions of constituents like iron which consume valuable acid. Such slags are produced by smelting titaniferous ores in the presence of various fluxing agents, and usually contain appreciable amounts of acid-consuming constituents such as FeO, CaO, MgO, SiO$_2$ and Al$_2$O$_3$ in addition to TiO$_2$. Various methods for producing fluid slags from titaniferous ores have been suggested in the past. In general these have been methods for forming low-melting-point titanates such as sodium titanate or high iron content iron magnesium dititanate, (Fe, Mg)O.2TiO$_2$, or mixtures of such titanates to obtain eutectics between the titanate phases. In such processes the titanates ordinarily constitute the major part of the slag composition. The silicate phase in these titanate slags is only incidental in obtaining low-melting, fluid slags. Although these processes are successful in removing the greater portion of the iron in the ore as useful metallic iron and may produce slags which are amenable to sulfate digestion, they suffer from the disadvantage that acid consuming constituents are added to the TiO$_2$, thus partially off-setting the advantages of such processes. Moreover, it has been found that slags prepared from certain titanium bearing ores which contain appreciable quantities of aluminum and silicon, do not digest satisfactorily in strong sulphuric acid due to the formation of bulky aluminum and silicon compounds which prevent the reaction of sulphuric acid and the titanium values from taking place in the normal manner.

The present invention provides methods for the preparation of novel titaniferous compositions using only moderate quantites of fluxing agents, which compositions are readily digestible in strong sulphuric acid, relatively high in titanium content, and relatively low in acid consuming constituents such as FeO, MgO, CaO, Al$_2$O$_3$, SiO$_2$, K$_2$O and Na$_2$O and are therefore especially suited for the economic preparation of titanium dioxide pigments.

The principal object of the present invention is therefore the preparation of compositions or concentrates from titaniferous ores, which concentrates are rich in titanium and relatively poor in FeO, CaO, MgO, Al$_2$O$_3$, SiO$_2$, K$_2$O and Na$_2$O and are readily digestible in strong sulphuric acid. Another object of the present invention is the preparation of slag compositions which when molten are not viscous and flow freely.

A still further object is to produce readily digestible titanium concentrates which do not contain excessive quantities of fluxing agents. These and other objects of the invention will be apparent from the following more complete description:

The compositions of the present invention are characterized broadly first as being readily digestible in strong sulphuric acid, the term "readily digestible" being hereinafter defined, second, as having a small content of unreduced iron (iron oxide, FeO) but appreciably less total iron than contained in the original titaniferous iron starting material.

For the purposes of the present invention, the term "readily digestible" indicates a composition which, when subjected to a test, the conditions of which are about to be described, gives a yield of solubilized titanium, calculated as TiO$_2$, of at least 80% of the total titanium content (TiO$_2$ basis) of the composition.

TEST FOR DIGESTIBILITY

Ten grams of comminuted titaniferous material of such fineness as to pass through a 325 mesh screen are heated in an oven to 100° C. Sulphuric acid of at least 85% strength, in an amount sufficient theoretically to combine with the base-forming elements, e. g. FeO, MgO and CaO in the material, and in addition to provide a ratio of H$_2$SO$_4$ to TiO$_2$ of 2.0 (assumed 96% solubilization of all reactable constituents) is weighed into a large test tube and heated, preferably by means of a sand bath, up to 150° C. to 170° C. The hot comminuted titaniferous material is then quickly poured into the heated acid and the whole is thoroughly mixed. Reaction starts promptly and the temperature rises rapidly 30°–50° C., and then slowly falls. When the digestion mass in the test tube begins to thicken, the test tube is placed in an oven at 170° C.–190° C. and left there for two hours in order to "dry out" or "cure" the digestion cake. The cured cake is then dissolved in water or weak sulphuric acid. The content of dissolved TiO$_2$ is determined by conventional analytical procedures.

The titaniferous compositions described in the appended claims as "digestible in strong sulphuric acid" when subject to the foregoing test will show yields of solubilized TiO$_2$ of at least 80%. Preferred compositions will give yields of 90% and higher.

Compositions having the foregoing characteristics are obtained by the process of the instant invention which comprises forming a mixture comprising a titaniferous iron ore containing from 8% to 65% TiO$_2$, said mixture also comprising an oxidic compound of silicon, an oxidic compound of aluminum, an oxidic compound of sodium, and/or potassium and a carbonaceous reducing agent. The mixture is heated to form molten iron metal and a titanium slag. The molten iron and titanium slag are separated from one another and the slag portion acid-leached with dilute sulphuric acid to produce a digestible titanium concentrate. It has been found that the FeO content in the slag before acid-leaching may be present in an amount from 2% to 20%. The amount of fluxing agents present in the mixture should be sufficient to produce a slag in which the sum of the $$SiO_2 + Al_2O_3 + Na_2O + 0.66K_2O$$

is from 0.75 to 2.2 parts for each part of TiO₂, and in which the SiO₂ is from 40–55%, the Al₂O₃ from 20–35%, and the Na₂O+0.66 K₂O from 20–30% of the total SiO₂+Al₂O₃+Na₂O and/or potassium present in the slag. In general the greatest solubilization of the gangue constituents is experienced when the SiO₂ is from 45–50%, the Al₂O₃ from 24–30% and the Na₂O+0.66 K₂O from 22–28% of the total SiO₂+Al₂O₃+Na₂O and/or K₂O present in the slag, and such compositions are usually preferred. These preferred compositions correspond roughly to a molecular composition which may be represented by the formula 1.5 Na₂O and/or $$K_2O \cdot Al_2O_3 \cdot 3SiO_2$$

Such a slag is then acid-leached with dilute sulphuric acid to remove the silicon, aluminum and sodium acid-soluble compounds thus leaving a TiO₂ enriched slag concentrate.

The titanium starting material used in the process of this invention preferably is a titaniferous iron ore. Titaniferous iron ores of various types have been employed. The titanium contents of such ores vary widely, and ores containing as low as 8% TiO₂ and as high as 65% TiO₂ have been employed with equal success. Ores containing small amounts of TiO₂ which are particularly adaptable are those of the magnetite-ilmenite and hematite-ilmenite type, while ores containing higher amounts of TiO₂ are those of the ilmenite type.

Substantially all titaniferous iron ores contain various amounts of silica and alumina. It has been found by the process of the instant invention, however, that when the ratios and total contents of oxidic compounds of aluminum, silicon and sodium and/or potassium in the charge are properly adjusted, substantially all of the silicon and aluminum constituents in the ore are converted to a form which permits a free flowing and fluid slag to be obtained during the heating step, and in which moreover these aluminum and silicon constituents are readily soluble in dilute sulphuric acid, and consequently readily removed during the subsequent leaching operation. By the term "oxidic compounds of aluminum, silicon, potassium and sodium" it is meant to include oxides, carbonates, hydroxides and other compounds which form oxides upon heating.

The fluxing agents to be employed may be added as chemical compounds or as natural minerals, such as feldspars, nepheline and the like.

It has been found that if the amounts of oxidic compounds of aluminum, silicon and sodium and/or potassium are adjusted in the mixture to fall within certain specified limits, the titanium values will remain in an insoluble form during a dilute acid leaching operation, while a large portion of the silicon, aluminum, potassium and sodium and also substantial amounts of the iron, calcium and magnesium constitutents will be solubilized. This process therefore provides means for the production of a titanium concentrate which is low in silica, alumina, lime, magnesium and iron.

It has been found that the process of the instant invention should be carried out at temperatures between about 1300° C. and 1700° C. to sufficiently reduce the iron values in the titaniferous iron ore. It is preferable, however, to carry out the smelting operation at temperatures from 1300° C. to 1500° C. Higher temperatures may be employed but careful operation is necessary to avoid excessive reduction of the iron values and even the titanium values as well as excessive losses of the soda values. By smelting within the temperature range and using the fluxing agents previously described, a fluid, free-flowing slag is produced and both the silica and alumina constituents in the ore are fixed in the slag in a form in which they may be readily solubilized during a subsequent acid leaching operation.

In carrying out the process of the instant invention the titaniferous iron ore is admixed with the proper amounts of fluxing agents and with a carbonaceous reducing agent, such as e. g. powdered carbon, coke or coal. The amount of carbonaceous reducing agent to be employed should be sufficient to reduce substantially all of the iron oxide values to metallic iron. The mixture is then heated to a temperature between 1300° C.–1700° C. until the iron content remaining in the slag portion is between 2–20% FeO.

In forming the mixture of the titaniferous iron ore and the fluxing agents it is necessary to have present in the charge sufficient oxidic compounds of silicon, aluminum and sodium and/or potassium, including those already present in the ore, to produce a slag which contains for each part of TiO₂ present in the slag from 0.75–2.2 parts SiO₂+Al₂O₃+Na₂O+0.66 K₂O, and these fluxing agents should be present in proportions such that the SiO₂ is from 40–55%, the Al₂O₃ from 20–35% and the $$Na_2O + 0.66\ K_2O$$

from 20–30% of the total SiO₂+Al₂O₃+Na₂O+0.66 K₂O.

Since sodium or potassium may be employed either singly or together in conjunction with the silica and alumina values as fluxing agents in the process of the instant invention, it is convenient to express the K₂O values as Na₂O since both the sodium and potassium values may replace one another on a mole basis. In order to express the K₂O on a Na₂O weight basis, the percentage of K₂O multiplied by the factor 0.66 gives the Na₂O equivalent on a weight basis. Whether sodium or potassium are used alone or in combination with one another, the sodium and potassium values will hereinafter be expressed as the sum of Na₂O+0.66 K₂O. This sum should lie somewhere between about 20% and 30% of the total SiO₂+Al₂O₃+Na₂O+0.66 K₂O present in the slag.

The slag and molten iron metal formed as separate layers in the furnace are then separated from one another. The slag is then leached in dilute sulphuric acid to solubilize the sodium, and/or potassium, aluminum and silicon acid soluble values but not the titanium values and the leached slag is separated from the leach liquor. The acid leached slag formed by the process of this invention is readily digestible in strong sulphuric acid by the method previously described.

In slagging operations it is difficult to maintain all of the sodium or potassium values in the mixture as the slagging operation proceeds. Usually a portion of the sodium or potassium content added as a fluxing agent is volatilized during the heating operation and therefore a portion is lost from the system. The amount of sodium or potassium content lost during the operation may vary widely with the individual furnace used. It is therefore necessary to take this loss factor into account when determining the amount of fluxing agents to be employed in the instant smelting operation. By minimum experimentation it is simple to determine the amount of sodium or potassium loss on the particular furnace to be employed and such loss is then compensated for in subsequent smelting runs.

In carrying out the acid-leaching operation, it has been found that satisfactory results have been obtained when dilute sulphuric acid is employed. The strength of sulphuric acid used preferably should be from 5% to 15%. The amount of sulphuric acid employed in the leaching operation should be in at least slight excess over the amount required to react with all of the sodium, aluminum and silicon constituents and between 30% and 60% of the Fe, Ca and Mg constituents. It is preferred to carry out the leaching operation at temperatures from 25° C. to 80° C. The particle size of the slag may vary from minus 20 mesh to substantially all minus 325 mesh. By carrying out the leaching operation within the preferred limits previously given it has been found that efficient leaching of the aluminum and silicon constituents will be obtained with a minimum of loss of titanium values.

In order to more fully illustrate the instant invention the following examples are presented to show typical operations employing various types of titaniferous iron ores using various amounts of fluxing agents.

Example 1

100 parts of ilmenite ore were dry blended with 23.2 parts of $SiO_2$, 13.0 parts of $Al_2O_3$ and 15.0 parts of $Na_2O$, and 12 parts of coke. The ore had the following analysis on a weight percent basis:

| | |
|---|---:|
| $TiO_2$ | 58.4 |
| FeO | 12.0 |
| $Fe_2O_3$ | 24.7 |
| CaO | 1.0 |
| $SiO_2$ | 1.8 |
| $Al_2O_3$ | 1.2 |
| MgO | 0.9 |

The above mixture was charged into an arc furnace, heated to 1500° C. and held at that temperature for 1 hour. The molten iron and the slag were separately tapped from the furnace. The slag produced was fluid and free-flowing.

The cooled slag was ground to substantially all minus 325 mesh (2%+325) and analyzed. The slag had the following analysis:

| | |
|---|---:|
| $TiO_2$ | 51.3 |
| FeO | 2.6 |
| $Na_2O$ | 9.0 |
| CaO | 1.1 |
| $SiO_2$ | 20.0 |
| $Al_2O_3$ | 15.6 |
| MgO | 0.4 |

It should be noted that the FeO content of the slag was 2.6% and for each part of $TiO_2$ present in the slag there were .87 part of $SiO_2+Al_2O_3+Na_2O$.

The ground slag was then leached in 10% sulphuric acid for one-half hour at 75° C. with rapid stirring and leach liquor was removed from the leached slag by filtration. The leached slag after drying had the following analysis:

| | |
|---|---:|
| $TiO_2$ | 84.4 |
| FeO | 3.4 |
| $Na_2O$ | 2.1 |
| CaO | 0.8 |
| $SiO_2$ | 3.0 |
| $Al_2O_3$ | 5.4 |
| MgO | 0.9 |

The leached slag was then digested in 89% sulphuric acid according to the digestion procedure given above and a $TiO_2$ recovery of 94.5% of the titanium values in the slag was digested and recovered as soluble titanium sulphate.

Example 2

Another slag was prepared using a titaniferous iron ore having the following analysis:

| | |
|---|---:|
| $TiO_2$ | 21.8 |
| FeO | 34.3 |
| $Fe_2O_3$ | 33.6 |
| CaO | 0.6 |
| $SiO_2$ | 3.0 |
| $Al_2O_3$ | 4.8 |
| MgO | 1.9 |

100 parts of this ore were mixed with 5.45 parts of $SiO_2$, 6.00 parts of $Na_2O$ and 15 parts of coke. The mixture was processed according to procedure described in Example 1 and the results are recorded in Table 1.

Example 3

Another slag was prepared using another type of ilmenite which had the following analysis:

| | |
|---|---:|
| $TiO_2$ | 40.3 |
| FeO | 28.6 |
| $Fe_2O_3$ | 19.1 |
| CaO | 1.0 |
| $SiO_2$ | 3.8 |
| $Al_2O_3$ | 3.9 |
| MgO | 3.3 |

100 parts of this ore were blended with 11.8 parts of $SiO_2$, 5.0 parts of $Al_2O_3$, 11.0 parts of $Na_2O$ and 13 parts of coke. The mixture was processed according to the procedure described above and the results are recorded in Table 1.

Example 4

Another slag was prepared using a titaniferous iron ore having the following analysis:

| | |
|---|---:|
| $TiO_2$ | 19.5 |
| FeO | 30.4 |
| $Fe_2O_3$ | 26.3 |
| CaO | 2.6 |
| $SiO_2$ | 12.3 |
| $Al_2O_3$ | 6.9 |
| MgO | 2.0 |

100 parts of this ore were mixed with 2.0 parts of $SiO_2$, 8.7 parts of $Na_2O$ and 15 parts of coke. The mixture was processed according to the procedure described in Example 1 and the results are recorded in Table 1.

Example 5

Another slag was prepared using a titaniferous iron ore having the following analysis:

| | |
|---|---:|
| $TiO_2$ | 9.5 |
| FeO | 32.1 |
| $Fe_2O_3$ | 48.4 |
| CaO | 0.6 |
| $SiO_2$ | 2.3 |
| $Al_2O_3$ | 5.8 |
| MgO | 1.3 |

100 parts of this ore were mixed with 7.9 parts of $SiO_2$, 7.2 parts of $Na_2O$ and 17.5 parts of coke. The mixture was processed according to the procedure described in Example 1 and the results are recorded in Table 1.

Example 6

Another slag was prepared using the ilmenite ore shown in Example 1 in which more $Na_2O$ was added as a fluxing agent. In this example 100 parts of the ore were blended with 23.2 parts of $SiO_2$, 13.0 parts of $Al_2O_3$, 18.3 parts of $Na_2O$, and 12 parts of coke. The mixture was processed according to the procedure described in Example 1 and the results are recorded in Table 1.

Example 7

Another slag was prepared using the titaniferous iron ore shown in Example 2 in which more $SiO_2$ was added as a fluxing agent. In this example 100 parts of the ore were blended with 8.3 parts of $SiO_2$, 6.0 parts of $Na_2O$ and 15 parts of coke. The mixture was again processed according to the procedure described in Example 1 and the results are recorded in Table 1.

TABLE 1

| Example No. | 1 | 2 | 3 | 4 | 5 | 6 | 7 |
|---|---|---|---|---|---|---|---|
| Slag Analysis (Percent): | | | | | | | |
| $TiO_2$ | 51.3 | 47.6 | 51.4 | 38.4 | 28.6 | 49.0 | 40.1 |
| FeO | 2.6 | 2.7 | 2.5 | 3.0 | 3.0 | 4.5 | 9.4 |
| CaO | 1.1 | 2.4 | 1.3 | 5.2 | 1.8 | 0.9 | 2.3 |
| MgO | 0.4 | 4.1 | 4.2 | 4.0 | 3.9 | 0.7 | 3.7 |
| $Al_2O_3$ | 15.6 | 12.7 | 11.4 | 13.5 | 17.5 | 12.8 | 9.9 |
| $SiO_2$ | 20.0 | 20.0 | 19.9 | 24.3 | 30.7 | 20.1 | 23.8 |
| $Na_2O$ | 9.0 | 9.2 | 9.3 | 11.6 | 14.5 | 12.0 | 10.8 |
| Other | | 1.3 | | | | | |
| Total | 100.0 | 100.0 | 100.0 | 100.0 | 100.0 | 100.0 | 100.0 |
| Ratio in Slag: $SiO_2+Al_2O_3+Na_2O$: | | | | | | | |
| $TiO_2$ | 0.87 | 0.88 | 0.79 | 1.29 | 2.19 | 0.92 | 1.11 |
| Percent of Total $SiO_2+Al_2O_3+Na_2O$, Present as— | | | | | | | |
| $SiO_2$ | 45 | 48 | 49 | 49 | 49 | 45 | 53 |
| $Al_2O_3$ | 35 | 30 | 28 | 27 | 28 | 28 | 22 |
| $Na_2O$ | 20 | 22 | 23 | 24 | 23 | 27 | 25 |
| Leaching Conditions: | | | | | | | |
| Percent $H_2SO_4$ Strength | 10 | 10 | 10 | 10 | 10 | 10 | 10 |
| Time, Hrs. | ½ | 1 | 1 | 1 | 1 | 1 | ½ |
| Temp., °C | 75 | 75 | 75 | 75 | 75 | 75 | 100 |
| $H_2SO_4$/Slag Ratio | 0.75 | 0.75 | 0.75 | 1.0 | 1.2 | 0.75 | 1.0 |
| Analysis of Leached Slag (Percent): | | | | | | | |
| $TiO_2$ | 84.4 | 83.0 | 87.5 | 78.0 | 76.0 | 83.5 | 80.6 |
| FeO | 3.4 | 3.7 | 2.3 | 3.2 | 4.2 | 3.7 | 5.6 |
| CaO | 0.8 | 1.1 | 1.6 | 7.6 | 3.6 | 0.9 | 0.7 |
| MgO | 0.9 | 5.8 | 5.0 | 6.0 | 7.5 | 0.8 | 5.8 |
| $Al_2O_3$ | 5.4 | 2.2 | 0.9 | 1.3 | 2.5 | 2.9 | 1.4 |
| $SiO_2$ | 3.0 | 1.4 | 1.8 | 2.6 | 4.2 | 2.7 | 2.5 |
| $Na_2O$ | 2.1 | 0.4 | 0.9 | 1.3 | 2.0 | 5.5 | 2.6 |
| Other | | 2.4 | | | | | 0.8 |
| Total | 100.0 | 100.0 | 100.0 | 100.0 | 100.0 | 100.0 | 100.0 |
| Digestibility of Leached Slag Percent $TiO_2$ Recovery | 94.5 | 80.5 | 80.0 | 90.0 | 85.0 | 94.0 | 97.0 |

In the following example $K_2O$ is used to replace part or all of the $Na_2O$ employed in the previous examples.

*Example 8*

Using the ore described in Example 2, 100 parts of the ore were mixed with 5.5 parts $SiO_2$, 13.4 parts of $K_2CO_3$ and 15 parts of coke. The mixture was processed according to the procedure described in Example 1 and the results are recorded in Table 2.

*Example 9*

Using the ore described in Example 2, 100 parts of the ore were mixed with 6.8 parts of $K_2CO_3$, 5.1 parts of $Na_2CO_3$, 5.5 parts of $SiO_2$ and 15 parts of coke. After processing in the same manner a fluid slag was obtained and the results are recorded in Table 2.

*Example 10*

Using the ore described in Example 1, 100 parts of the ore were mixed with 33.4 parts of $K_2CO_3$, 13.0 parts of $Al_2O_3$, 23.2 parts of $SiO_2$ and 12 parts of coke. The slag produced was similar to that obtained in Example 1. The results are recorded in Table 2.

*Example 11*

Example 10 was repeated except that 16.8 parts of $K_2CO_3$ and 12.8 parts of $Na_2CO_3$ were used instead of 33.4 parts of $K_2CO_3$. The amounts of $SiO_2$, $Al_2O_3$ and coke added in this example were the same as that employed in Example 10. The results are recorded in Table 2.

TABLE 2

| Example No. | 8 | 9 | 10 | 11 |
|---|---|---|---|---|
| Slag Analysis (Percent): | | | | |
| $TiO_2$ | 46.3 | 47.6 | 49.5 | 50.1 |
| FeO | 1.5 | 2.3 | 2.4 | 3.3 |
| CaO | 2.0 | 2.1 | 0.9 | 1.0 |
| MgO | 4.3 | 4.4 | 0.8 | 0.7 |
| $Al_2O_3$ | 11.8 | 11.4 | 12.1 | 13.2 |
| $SiO_2$ | 19.2 | 20.5 | 21.3 | 20.7 |
| $Na_2O$ | | 4.6 | | 4.1 |
| $K_2O$ | 14.9 | 7.1 | 13.0 | 6.9 |
| Ratio in Slag: $SiO_2+Al_2O_3+Na_2O+0.66 K_2O$: | | | | |
| $TiO_2$ | 0.88 | 0.87 | 0.85 | 0.85 |
| Percent of Total ($SiO_2+Al_2O_3+Na_2O+0.66 K_2O$), Present as— | | | | |
| $SiO_2$ | 47 | 50 | 51 | 49 |
| $Al_2O_3$ | 29 | 28 | 29 | 31 |
| $Na_2O+0.66 K_2O$ | 24 | 22 | 20 | 20 |
| Leaching Conditions: | | | | |
| Percent $H_2SO_4$ Strength | 10 | 10 | 10 | 10 |
| Time, Hours | 1 | 1 | 1 | 1 |
| Temp., °C | 75 | 75 | 75 | 75 |
| $H_2SO_4$/Slag Ratio | 0.75 | 0.75 | 0.75 | 0.75 |
| Analysis of Leached Slag (Percent): | | | | |
| $TiO_2$ | 85.5 | 84.1 | 87.6 | 88.4 |
| FeO | 1.1 | 2.2 | 2.3 | 2.8 |
| CaO | 2.2 | 2.1 | 1.2 | 1.1 |
| MgO | 5.9 | 6.1 | 1.0 | 0.9 |
| $Al_2O_3$ | 2.1 | 2.3 | 3.2 | 2.5 |
| $SiO_2$ | 1.9 | 2.0 | 2.5 | 2.1 |
| $Na_2O$ | | 0.4 | | 0.9 |
| $K_2O$ | 1.3 | 0.8 | 2.2 | 1.3 |
| Digestibility of Leached Slag, Percent $TiO_2$ Recovery | 92.9 | 89.0 | 88.0 | 92.5 |

It has clearly been shown by the description of the instant invention and by the examples presented that readily digestible titanium concentrates may be prepared from raw materials containing various impurities such as alumina and silica. Such concentrates are rich in titanium values and relatively poor in iron, alumina and silica. By the process of the instant invention the alumina and silica constituents which normally are difficult and sometimes substantially impossible to handle are fixed in the slag by converting them to acid soluble compositions by the addition of oxidic compounds of silicon, aluminum and sodium and/or potassium as fluxing agents. The amounts of oxidic compounds of aluminum, silicon and sodium and/or potassium added as fluxing agents are carefully controlled within specified limits in order to convert the aluminum and silicon constituents in the ore to an acid-soluble form which in a subsequent acid leaching step may be readily removed. Slags prepared using oxidic compounds of silicon aluminum and sodium and/or potassium within the specified limits form free flowing and non viscous slags.

Such free-flowing slags provide efficient and effective separations of the slag and molten iron portions. Such slags are easy to handle and economical to process. The titanium concentrate formed according to the instant invention contains only small amounts of residual iron, aluminum and silicon constituents thereby providing for a titanium concentrate high in $TiO_2$ content.

While this invention has been described and illustrated by the examples shown, it is not intended to be strictly limited thereto and other modifications and variations may be employed within the scope of the following claims.

We claim:

1. A method for producing a digestible titanium concentrate which comprises forming a mixture comprising a titaniferous iron ore which contains from 8% to 65% $TiO_2$, said mixture also comprising a carbonaceous reducing agent, an oxidic compound of silicon, an oxidic compound of aluminum, and a compound selected from the group consisting of oxidic compound of sodium, oxidic compound of potassium and mixtures thereof, heating said mixture to form a slag and molten iron at a temperature between 1300° C. and 1700° C. until the FeO content of said slag is reduced to between 2% and 20%, the amount of oxidic compounds of silicon, aluminum and sodium plus potassium present in said mixture being sufficient to produce a slag in which the sum of the $SiO_2$, $Al_2O_3$, and $Na_2O+0.66$ $K_2O$ is from 0.75 to 2.2 parts for each part of $TiO_2$, and in which the $SiO_2$ is from 40% to 55%, the $Al_2O_3$ is from 20% to 35% and the $Na_2O+0.66$ $K_2O$ is from 20% to 30% of the total $SiO_2+Al_2O_3+Na_2O+0.66$ $K_2O$ present in the slag, leaching said slag with dilute sulphuric acid to remove the silicon, aluminum and sodium+potassium acid-soluble compounds, the titanium values remaining in insoluble form in said slag during said leaching operation and separating the leach liquor from the leached titanium slag.

2. Method according to claim 1 in which the $SiO_2$ is from 45% to 50%, the $Al_2O_3$ is from 24% to 30%, and the $Na_2O+0.66$ $K_2O$ is from 22% to 28% of the total $SiO_2+Al_2O_3+Na_2O+0.66K_2O$ present in the slag.

3. Method according to claim 1 in which said mixture is heated at a temperature of 1300° C.–1500° C.

4. Method according to claim 1 in which the slag is leached with sulphuric acid of strength between 5% and 15%.

5. Method according to claim 1 in which the slag is leached with dilute acid at temperatures between 25° C. and 80° C.

References Cited in the file of this patent

UNITED STATES PATENTS

| Number | Name | Date |
|---|---|---|
| 921,686 | Fitzgerald et al. | May 18, 1909 |
| 1,717,542 | Rossi et al. | Feb. 15, 1916 |
| 1,343,441 | Farup | June 15, 1920 |
| 1,489,417 | Bachman | Apr. 8, 1924 |
| 1,618,795 | Bachman | Feb. 22, 1927 |
| 1,699,173 | Whittemore | Jan. 15, 1929 |
| 2,375,268 | Wyckoff | May 8, 1945 |
| 2,417,101 | Campbell | Mar. 11, 1947 |
| 2,445,377 | Wyckoff | July 20, 1948 |
| 2,453,050 | Turbett | Nov. 2, 1948 |
| 2,471,242 | Royster | May 24, 1949 |
| 2,476,453 | Peirce et al. | July 19, 1949 |
| 2,631,941 | Cole | Mar. 17, 1953 |

FOREIGN PATENTS

| 251,527 | Great Britain | May 6, 1926 |

OTHER REFERENCES

Engineering and Mining Journal, April 1942, page 77.